United States Patent
Yamatoya et al.

(10) Patent No.: US 8,457,451 B2
(45) Date of Patent: Jun. 4, 2013

(54) SEMICONDUCTOR OPTICAL ELEMENT

(75) Inventors: Takeshi Yamatoya, Tokyo (JP);
Yoshimichi Morita, Tokyo (JP);
Chikara Watatani, Tokyo (JP)

(73) Assignee: Mitsubishi Electric Corporation,
Tokyo (JP)

( * ) Notice: Subject to any disclaimer, the term of this patent is extended or adjusted under 35 U.S.C. 154(b) by 537 days.

(21) Appl. No.: 12/690,950

(22) Filed: Jan. 21, 2010

(65) Prior Publication Data

US 2010/0272389 A1 Oct. 28, 2010

(30) Foreign Application Priority Data

Apr. 27, 2009 (JP) .................................. 2009-108030

(51) Int. Cl.
*G02B 6/12* (2006.01)

(52) U.S. Cl.
USPC .................. 385/14; 257/E21.06; 257/E21.015

(58) Field of Classification Search
USPC ........ 385/132; 257/E21.06, E21.015, E21.233
See application file for complete search history.

(56) References Cited

U.S. PATENT DOCUMENTS

| 6,784,064 B2 | 8/2004 | Yaegashi et al. |
| 7,184,207 B1 * | 2/2007 | Walker et al. ................. 359/344 |
| 7,256,433 B2 | 8/2007 | Kurokawa et al. |

FOREIGN PATENT DOCUMENTS

| JP | 2001-189523 A | 7/2001 |
| JP | 2002-198514 A | 7/2002 |
| JP | 2002-217446 A | 8/2002 |
| JP | 2004-71701 A | 3/2004 |
| JP | 2004-327904 A | 11/2004 |

OTHER PUBLICATIONS

State Intellectual Property Office of the People's Republic of China, Official Action in Chinese Patent Application No. 201010159579.8 and partial English translation, (Nov. 25, 2011).
Adachi et al.; "Chemical Etching of InGaAsP/InP DH Wafer", *J. Electrochem. Soc.: Solid-State Science and Technology*, pp. 1053-1062, (May 1982).

* cited by examiner

*Primary Examiner* — Uyen Chau N Le
*Assistant Examiner* — Chris Chu
(74) *Attorney, Agent, or Firm* — Leydig, Voit & Mayer, Ltd.

(57) ABSTRACT

A semiconductor optical element having a mesa structure formed by wet etching, includes a mesa structure having a ridge-type mesa structure or a high-mesa-type mesa structure, the mesa structure being disposed on a semiconductor substrate, and an extended mesa on the semiconductor substrate, the extended mesa being connected to a corner of the mesa structure and being the same material as the mesa structure.

17 Claims, 5 Drawing Sheets

SEMICONDUCTOR OPTICAL ELEMENT

BACKGROUND OF THE INVENTION

1. Field of the Invention

The present invention relates to a semiconductor optical element which has a ridge-type structure or a high-mesa-type structure and a method for manufacturing the semiconductor optical element.

2. Background Art

Generally, a ridge-type optical waveguide or a high-mesa-type optical waveguide is used in a semiconductor optical element. In the ridge-type optical waveguide, light is confined in a horizontal direction by an upper clad layer which is etched to a mesa stripe shape. Since a core layer is not etched, the defect level of the semiconductor optical element can be reduced in the ridge-type optical waveguide. On the other hand, the high-mesa-type optical waveguide has a structure in which not only the upper clad layer but also the core layer and the lower clad layer are etched to a mesa stripe shape. The high-mesa-type structure has features of being capable of reducing an electrical capacitance when applied to a semiconductor optical element since the effect of the light confinement in the horizontal direction is large.

As just described, both of the semiconductor optical element having a high-mesa-type optical waveguide and the semiconductor optical element having a ridge-mesa-type optical waveguide have a mesa structure. The mesa structure is formed by wet etching. Advantages obtained by using the wet etching are mainly following two points. First, the etching can be stopped between two layers having a different composition from each other when an etchant and a semiconductor layer which is to be etched is properly selected. Second, the mesa structure which has a crystal face having a particular plane direction can be formed. Therefore a desired mesa structure can be formed by using the wet etching.

For example, there is a following description in "S. Adachi et al., Journal of The Electrochemical Society, vol. 129, no. 5, pp. 1053-1062(1982)". That is, an n-InP clad layer, an undoped InGaAsP optical waveguide, a p-InP clad layer are formed one by one on an n-InP subsrate having a (001) face. Next, a $SiO_2$ mask is formed on a wafer including the above layers. Next, the wafer is etched using HCl (hydrochloric acid): H3PO4 (phosphoric acid)=1:5-solution so that the p-InP clad layer is etched until the wet etching is stopped at a top surface of the InGaAsP optical waveguide layer. A side surface of the mesa structure formed by the etching is almost perpendicular to a (001) face when the wafer is cleaved in a (100) face. On the other hand, the side surface is inclined by 35 degrees to the (100) face when the wafer is cleaved in a (-110) face. In this way, a mesa structure is formed through the wet etching. Other methods for manufacturing the semiconductor optical element are disclosed in Patent Document 1-4.

Patent Document 1 is Japanese Patent Application Laid-Open No. 2004-327904, Patent Document 2 is Japanese Patent Application Laid-Open No. 2001-189523, Patent Document 3 is Japanese Patent Application Laid-Open No. 2004-071701, and Patent Document 4 is Japanese Patent Application Laid-Open No. 2002-198514.

When the wet etching is used as described above, the etching is stopped at a desired plane direction so that a mesa structure can be formed. However, when the mesa structure to be formed has a corner part, there is a problem that an abnormal etching proceeds in the corner part and a desired mesa structure can't be formed.

The corner part is, for example, a position at which two sides of the mesa structure intersect so as to form an angle of 90 degrees. As a concrete example of the abnormal etching, a ridge-type multimode interference (MMI) optical coupler will now be described. Upon manufacturing this ridge-type MMI optical coupler, a $SiO_2$ mask is formed on a wafer which includes an n-InP subsrate as well as an n-InP clad layer, an undoped InGaAsP optical waveguide and a p-InP clad layer formed one by one on a (001) face of the n-InP subsrate. The n-InP clad layer of the wafer is etched using a solution of HCl:H3PO4=1:5-solution.

In the ridge-type MMI optical coupler, an input optical waveguide and an output optical waveguide are connected to a rectangular mesa structure. In the rectangular mesa structure, when a longer sideline is parallel to a (-110) face of the InP subsrate and a shorter sideline is parallel to a (110) face of the InP subsrate, a face (a perpendicular face) almost perpendicular to a (001) face is formed in the longer sideline and a face (a 35 degrees face) inclining by 35 degrees to a (001) face is formed in the shorter sideline. On "a corner part" at which the above described longer sideline and shorter sideline intersect with 90 degrees, the etching doesn't stop and but proceeds in the perpendicular surface and the 35 degrees surface. This etching proceeding in the corner part of the mesa structure is referred to as an anomal etching.

As a result of the abnormal etching in the corner part of the mesa structure, there arises a problem that the mesa structure is not formed as planned whereby a desired property is not given to the semiconductor optical element.

SUMMARY OF THE INVENTION

The present invention has been implemented to solve the above described problem and it is an object of the present invention to provide a semiconductor optical element which has a mesa structure formed by wet etching and a method for manufacturing the semiconductor optical element which can prevent an abnormal etching in the corner part of the mesa structure.

According to one aspect of the present invention, a semiconductor optical element having a mesa structure formed by wet etching, includes a mesa structure having a ridge-type mesa structure or a high-mesa-type mesa structure, the mesa structure being formed on a semiconductor substrate, and an extended mesa formed on the semiconductor substrate, the extended mesa being connected to a corner of the mesa structure and being formed of the same material as that of the mesa structure.

According to another aspect of the present invention, a method for manufacturing a semiconductor optical element includes the steps of forming an epitaxial layer as a base material for a mesa structure on a base layer, forming a mask material on the epitaxial layer, patterning the mask material on the epitaxial layer so that the mask material remains right above a region where the mesa structure should be formed and right above an extended mesa region which is extending from a first position where a corner of the mesa structure should be formed to a second position where is a predetermined distance apart from the first position, and wet-etching the epitaxial layer by using an etchant which can etch the epitaxial layer after patterning the mask material, the wet-etching being stopped before the epitaxial layer disappears.

Other and further objects, features and advantages of the invention will appear more fully from the following description.

DETAILED DESCRIPTION OF THE PREFERRED EMBODIMENTS

First Embodiment

Figure 1:
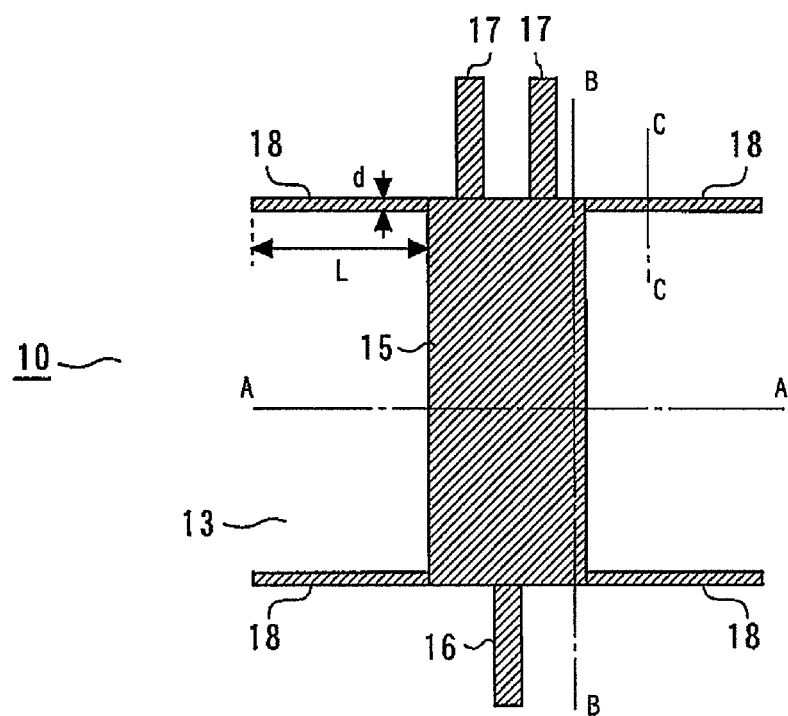
FIG. 1 is a plan view of a semiconductor optical element according to a first embodiment.

The present embodiment will be described below referring to FIGS. 1-9. Identical materials, identical and corresponding elements are designated by the same reference numerals as the corresponding elements and will be omitted from the description. The same can also be said with respects to another embodiment described below.

Figure 2:
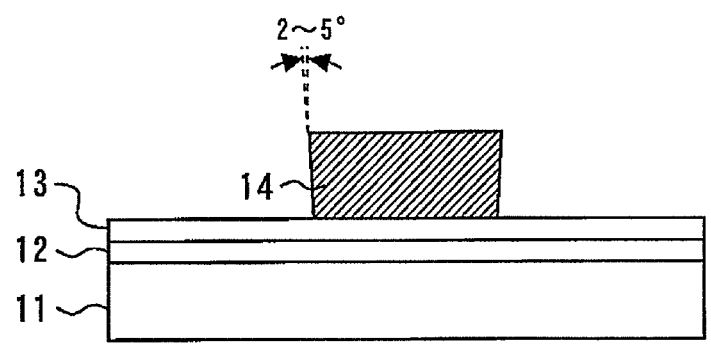
FIG. 2 is a cross-sectional view taken along line A-A of FIG. 1.
Figure 3:
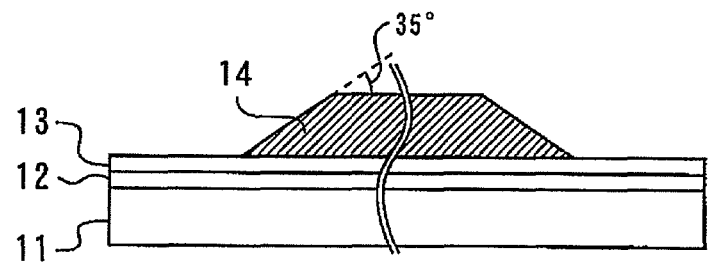
FIG. 3 is a cross-sectional view taken along line B-B of FIG. 1.
Figure 4:
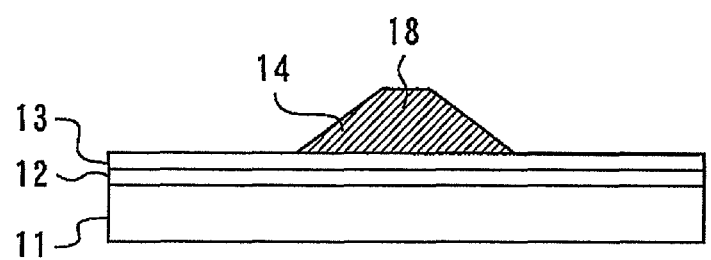
FIG. 4 is a cross-sectional view taken along line C-C of FIG. 1.

The present embodiment relates to a MMI optical coupler 10. FIG. 1 is a plan view of a semiconductor optical element according to a first embodiment. Also, FIG. 2 is a cross-sectional view taken along line A-A of FIG. 1, FIG. 3 is a cross-sectional view taken along line B-B of FIG. 1 and FIG. 4 is a cross-sectional view taken along line C-C of FIG. 1. As shown in FIG. 2-4, the MMI optical coupler 10 according to the present embodiment is formed on an n-InP subsrate 11, a front surface of which is a (001) face. An n-InP clad layer 12 the film thickness of which is 0.5 μm is formed on the n-InP subsrate 11. An undoped InGaAsP 13 the film thickness of which is 0.4 μm and the emission wavelength of which is 1.3 μm is formed on the n-InP clad layer 12. A p-InP clad layer 14 the film thickness of which is 3.2 μm is formed on the undoped InGaAsP 13.

The shaded area described in FIG. 1 is the region where the above described p-InP clad layer 14 was formed. The area other than the shaded area described in FIG. 1 is the region where the p-InP clad layer 14 is wet etched and the undoped InGaAsP 13 is exposed. That is to say, the shaded area described in FIG. 1 is a region protruding like a mesa. The above described shaded area is classified into a rectangular mesa structure 15, an input optical waveguide 16, an output optical waveguide 17, and an extended mesa 18 with respect to each purpose.

The rectangular mesa structure 15 has a longer sideline which is parallel to a (−110) face of the InP subsrate 11 and a shorter sideline which is parallel to a (110) face of the InP subsrate 11. The longer sideline of the rectangular mesa structure 15 is 55 μm and the shorter sideline of the rectangular mesa structure 15 is 6.5 μm. The width of the input optical waveguide 16 and the width of the output optical waveguide 17 are both 2 μm. The extended mesas 18 are formed like a stripe and connected to four corner parts of the rectangular mesa structure 15, respectively. The length (represented by L in FIG. 1) of the extended mesa 18 extending from the corner part of the rectangular mesa structure 15 to one end of the extended mesa 18 is 30 μm.

As shown in FIG. 2, a side surface of the longer sideline perpendicular direction of the rectangular mesa structure 15 is inclined by 2~5° degrees to the normal line of the n-InP subsrate 11. That is, the side surface of the longer sideline perpendicular direction of the rectangular mesa structure 15 is almost perpendicular to the (001) face.

As shown in FIG. 3, a side surface of the shorter sideline perpendicular direction of the rectangular mesa structure 15 is inclined by 35 degrees to the (001) face.

A cross-section surface of the extended mesa 18 viewed from its width direction is shown in FIG. 4. In FIG. 4, a width of a top surface of the extended mesa 18 is 1.5 μm and a width of a bottom surface of the extended mesa 18 is 7.2 μm.

Figure 5:
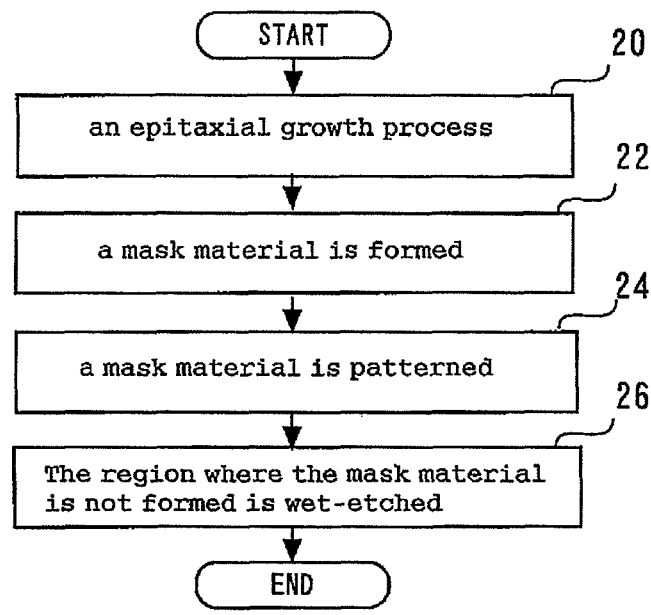
FIG. 5 is a flowchart illustrating a method for manufacturing a semiconductor optical element.
Figure 6:
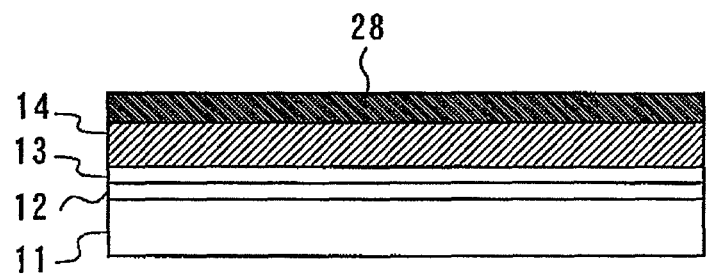
FIG. 6 is a cross-sectional view illustrating a semiconductor optical element after forming a mask material.
Figure 7:
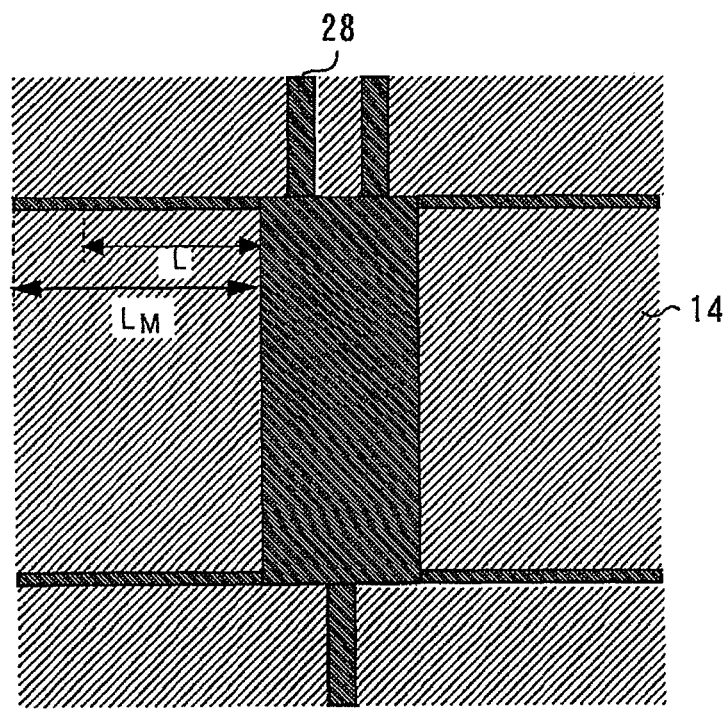
FIG. 7 is a plan view for illustrating a mask material patterning.

Next, a method for manufacturing the MMI optical coupler according to the present embodiment will be described below referring to FIGS. 5-7. FIG. 5 is a flowchart illustrating the method. The method will be described with reference to this flowchart. First, in step 20, an n-InP clad layer 12, an undoped InGaAsP 13 and a p-InP clad layer 14 is formed one by one on an n-InP subsrate 11 using an epitaxial growth process. Next, in step 22, a mask material is formed on the p-InP clad layer 14 which is an epitaxial layer. In FIG. 6 which is a cross-sectional view, a mask material 28 is described. In the present embodiment, the mask material 28 is $SiO_2$.

After completion of step 22, the method proceeds to step 24. In step 24, the mask material 28 is patterned. This patterning is performed so that the mask material 28 remaines immediately above the region where the rectangular mesa structure 15, the input optical waveguide 16, the output optical waveguide 17 and the extended mesa 18 are formed. That is, by this patterning, the mask material 28 is formed into the pattern shown in FIG. 7 which is a plan view. As shown in FIG. 7, the mask material 28 is patterned so that the length (represented by $L_M$ in FIG. 7) of the mask material 28 formed immediately above the portion that should be formed in the extended mesa is longer than the length (L) of the extended mesa 18 shown in FIG. 1.

After completion of step 24, the method proceeds to step 26. In step 26, part of the p-InP clad layer 14 where the mask material 28 is not formed is removed by wet etching. This wet etching is perfomed for six minitues using a HCl:H3PO4=1:5-solution as an etchant at 20 degrees Celsius. When the above-described etchant is used, the etching rate of the undoped InGaAsP 13 is exceedingly-small. Therefore this wet etching process is a selective wet etching process wherein the wet etching is stopped at a boundary between the undoped InGaAsP 13 and the p-InP clad layer 14. By performing this wet etching, the MMI optical coupler having the rectangular mesa structure 15 and the extended mesa 18 shown in FIG. 1 is formed.

Figure 8:
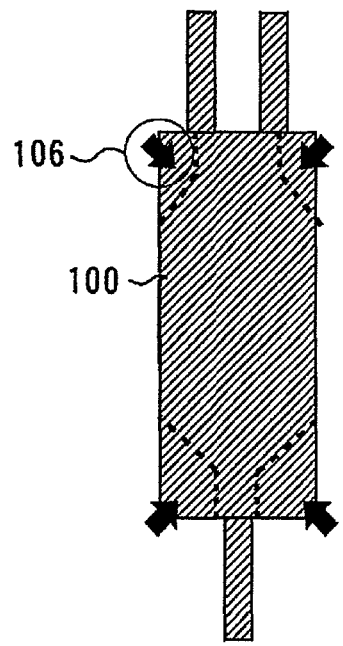
FIG. 8 is a view for illustrating a problem to be resolved by the present invention.

Here, part of the mask material 28 corresponding to the extended mesa 18 is formed so as to have the length $L_M$ which is longer than L shown in FIG. 1. In this case, L would accord with $L_M$ if the p-InP clad layer 14 is etched in accordance with the mask patterning. However, in "a corner part" of the extended mesa 18, the length of the extended mesa 18 is reduced by the wet etching since the above described abnormal etching proceeds. The wet etching according to the present embodiment is finished when the length of the extended mesa 18 is reduced to L shown in FIG. 1 as a result that the corner part of the portion that should be formed in the extended mesa 18 is abnormally etched. Therefore, the corner parts of the rectangular mesa structure 15 is protected by the extended mesa 18. This makes it possible to prevent that the corner part 106 of the rectangular mesa structure 100 shown in FIG. 8 is abnormally etched, thereby preventing a backdown of the corner part 106 from arising. Therefore, the rectangular mesa structure 15 can be formed as planned and desired properties can be given to the semiconductor optical element (the MMI optical coupler). The advantages such as an improvement of the yield are also achieved.

Since the MMI optical coupler is used to combine and split light, the portion of the MMI optical coupler which forms a mesa is designed taking its element properties into consideration. However, when the abnormal etching occurs in the corner part of the mesa structure, the size of the mesa structure agrees with the design data and the desired element properties (splitting light and combining light) can't be achieved. The mesa structure can be conformed to the design data and the desired element properties can be achieved by forming the extended mesa 18 like the present embodiment. In view of such characteristics, the effect of the present invention can be achieved as long as a corner part of a mesa structure is backing down by wet etching. Therefore, the semiconductor optical element according to the present embodiment is not limited to the MMI optical coupler.

As described above, the extended mesa 18 remains in the MI optical coupler after the wet etching according to the present embodiment. The extended mesas 18 are connected to the corner parts of the rectangular mesa structure 15. Therefore, light might leak out from the rectangular mesa structure 15 to the extended mesa 18. That is, when the width of the extended mesa is large, excessive loss of light might occur. Therefore, the width of the extended mesa 18 represented by d in FIG. 1 is preferably set to be 15 µm or less in the present embodiment. Thereby, the excessive loss of light is prevented.

The semiconductor optical element according to the present embodiment comprises a ridge-type optical waveguide. The effect of the present invention can be achieved as long as the mesa structure having the corner part is formed by the wet etching. Therefore, it is to be understood that the semiconductor optical element according to the present embodiment may be a high-mesa-type optical waveguide.

Figure 9:
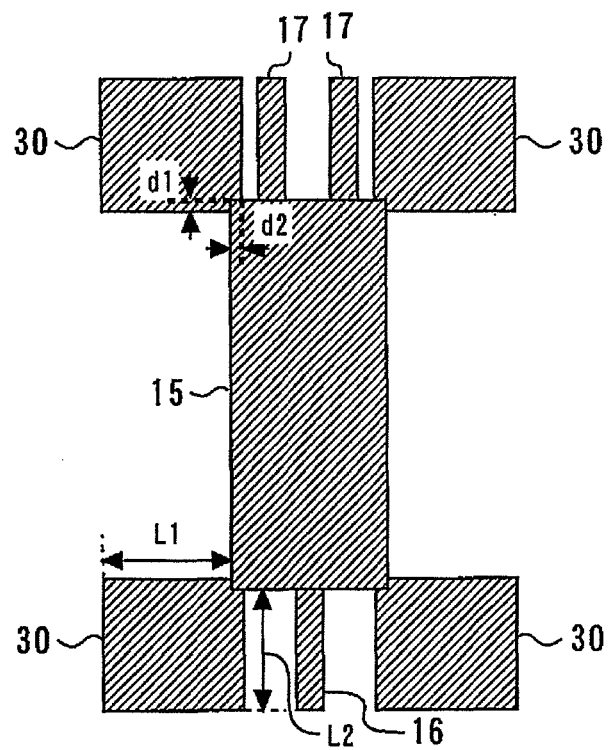
FIG. 9 is a view for illustrating a variation of a first embodiment.

In the present embodiment, the shape of the extended mesa 18 is a stripe-like shape. The shape of the extended mesa 18 is not limited to the stripe-like shape if the extended mesa is connected to the corner part of the mesa structure and the corner part can be protected from the abnormal etching. Therefore, it is to be understood that the semiconductor optical element may includes a square-shaped extended mesa 30 as shown in FIG. 9. In this case, in the portion of the rectangular mesa structure 15 where the square-shaped extended mesa 30 is connected to the rectangular mesa structure 15, the length represented by d1 and the length represented by d2 in FIG. 9 are both preferably set to be 1.5 µm (in mask size). Thereby, the above described excessive loss is prevented. In addition, L1 and L2 in FIG. 9 are both 30 µm.

In the present embodiment, the rectangular mesa structure 15 has a rectangular shape. The shape of the rectangular mesa structure 15 is not limited to a rectangular one as long as the structure has a corner part.

In the present embodiment, the HCl:H3PO4=1:5-solution is used as an etchant. An etchant used in the wet etching is not limited to the solution of 5:1 HCl:$H_3PO_4$ if the layers constituting the mesa structure 15 can be etched with the etchant. Also, an etchant used in the wet etching does not necessarily have a selectivity between the layers constituting the mesa structure and the base layer in view of "prevention of the abnormal etching".

Second Embodiment

Figure 10:
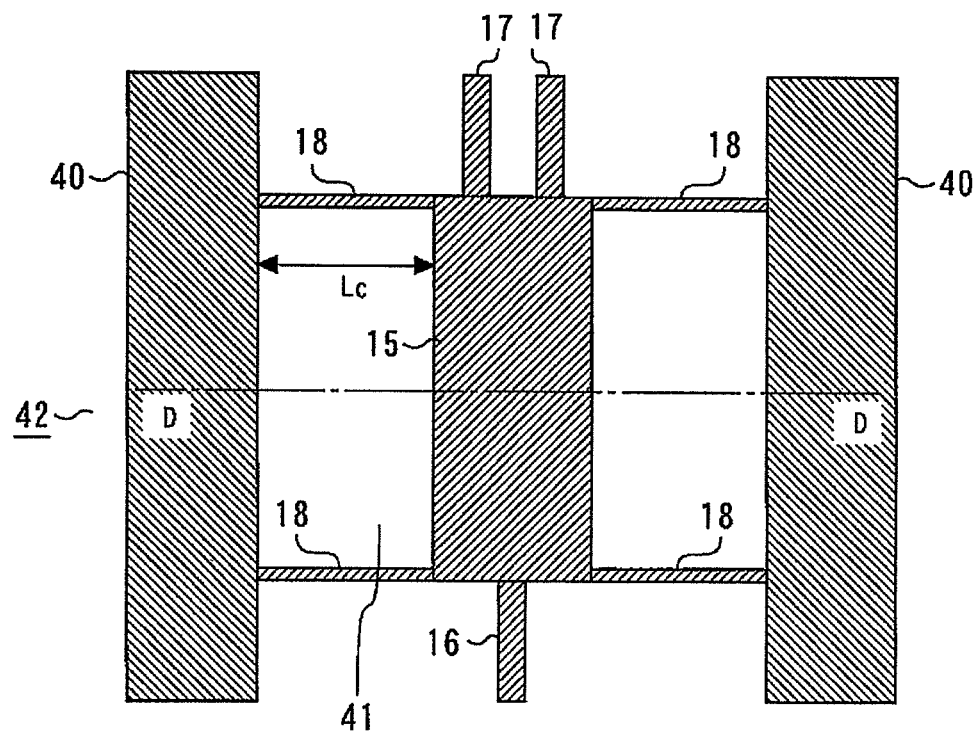
FIG. 10 is a plan view of a semiconductor optical element according to a second embodiment.
Figure 11:
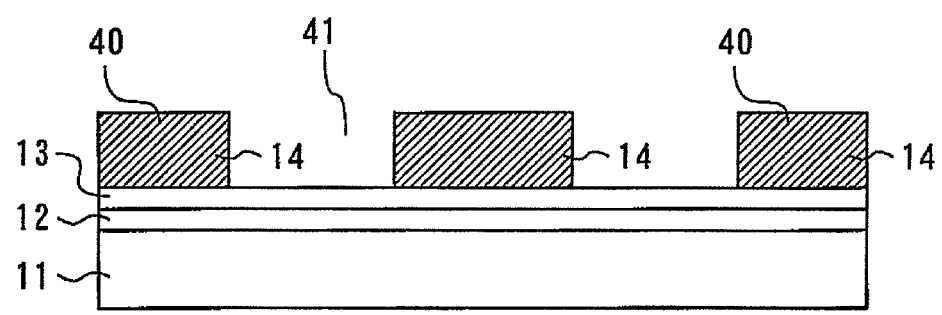
FIG. 11 is a cross-sectional view taken along line D-D of FIG. 10.

The present embodiment will be described below referring to FIGS. 10 and 11. FIG. 10 is a plan view and FIG. 11 is a cross-sectional view taken along line D-D of FIG. 10. In the present embodiment, the extended mesa 18 is formed like a stripe. One end of the extended mesa 18 is connected to the corner part of the rectangular mesa structure 15 and the other end of the extended mesa 18 is connected to a channel outside mesa 40 which is arranged so as to constitute a channel 41 with the rectangular mesa structure 15. The width (represented by Lc in FIG. 10) of the channel 41 is about 20 µm, but the width of the channel 41 is not limited to this length.

A method for manufacturing an MMI optical coupler 42 according to the present embodiment is basically the same as that of the first embodiment. However, in the step of patterning the mask material, the mask material is patterned so that the mask material remains in the region where the channel outside mesa 40 is formed. Therefore, the mask material above the region where the extended mesa 18 is formed connects the mask material above the region where the rectangular mesa structure 15 is formed and the mask material above the region where the channel outside mesa 40 is formed.

Thus, by the wet etching process corresponding to the first embodiment, the effect described in the first embodiment is achieved. In the semiconductor optical element of the present embodiment, the corner part is not formed in the extended mesa 18 and an abnormal etching does not occur in the extended mesa. Therefore, there is no need to make the extended mesas longer in the same manner as in the first embodiment. This results in increased degree of freedom in the length of the extended mesa.

Furthermore, variants corresponding to the variants applied to first embodiment is applied at least in the power module according to the present embodiment.

According to the present invention, it is possible to form a mesa structure by wet etching without arising any problem.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2009-108030, filed on Apr. 27, 2009 including specification, claims, drawings and summary, on which the Convention priority of the present application is based, are incorporated herein by reference in its entirety.

What is claimed is:

1. A semiconductor optical device comprising:
   a semiconductor substrate having a surface;
   a mesa structure supported by the surface of the semiconductor substrate and having, in a plan view perpendicular to the surface of the semiconductor substrate, a rectangular shape, with two longer sides, two shorter sides, and four corners, each corner being located at an intersection of one of the shorter sides and one of the longer sides; and
   four extended mesas supported by the surface of the semiconductor substrate, wherein
      each extended mesa extends from a corresponding corner of the mesa and is at least partially transverse to the longer sides of the mesa, and
      the mesa and the extended mesas are continuous and have the same composition; and first and second outside mesas supported by the surface of the semiconductor substrate and located opposite and spaced from respective longer sides of the mesa wherein each of the first and second outside mesas is joined to two of the extended mesas, and the mesas, the extended mesa, and the outside mesas are continuous and have the same composition.

2. The semiconductor optical device according to claim 1, wherein the longer sides of the mesa are planar surfaces that are nearly perpendicular to the surface of the semiconductor substrate.

3. The semiconductor optical device according to claim 1, wherein the shorter sides of the mesa are planar surfaces that are oblique to the surface of the semiconductor substrate.

4. The semiconductor optical device according to claim 3 including at least one optical waveguide extending from each of the planar surfaces of the shorter sides of the mesa.

5. The semiconductor optical device according to claim 1, wherein the extended mesas have, in the plan view perpendicular to the surface of the semiconductor substrate, stripe shapes.

6. The semiconductor optical device according to claim 5, wherein each of the extended mesas has, in a cross-sectional view taken perpendicular to the surface of the semiconductor substrate and parallel to the long sides of the mesa, a trapezoidal shape.

7. The semiconductor optical device according to claim 1, wherein each of the extended mesas has, in the plan view perpendicular to the surface of the semiconductor substrate, a rectangular shape and extends, in part, from one of the longer sides and from one of the shorter sides of the mesa at the corresponding corner of the mesa.

8. The semiconductor optical device according to claim 1 including at least one semiconductor layer on the surface of the semiconductor substrate and interposed between the surface of the semiconductor substrate and the mesa and the extended mesas.

9. The semiconductor optical device according to claim 1, wherein the substrate is InP.

10. The semiconductor optical device according to claim 1, wherein the semiconductor substrate is a crystalline semiconductor material, the surface of the semiconductor substrate lies in a (001) crystalline plane, the longer sides of the mesa are parallel to ($\bar{1}$10) crystalline planes of the semiconductor substrate, and the shorter sides of the mesa are parallel to (110) crystalline planes of the semiconductor substrate.

11. The semiconductor optical device according to claim 10 wherein the shorter sides of the mesa are planar surfaces that are inclined at approximately 35° with respect to the surface of the semiconductor substrate.

12. A semiconductor optical device comprising:
a semiconductor substrate having a surface;
a mesa structure supported by the surface of the semiconductor substrate and having, in a plan view perpendicular to the surface of the semiconductor substrate, a polygonal shape with longer sides, shorter sides, and a plurality of corners at intersections of the longer and shorter sides of the mesa; and
a plurality of extended mesas supported by the surface of the semiconductor substrate, wherein
a respective extended mesa joins and extends from each of the corners of the mesa, and
the mesa and the extended mesas are continuous and have the same composition; and first and second outside mesas supported by the surface of the semiconductor substrate and located opposite and spaced from respective longer sides of the mesa wherein each of the first and second outside mesas is joined to two of the extended mesas, and the mesas, the extended mesa, and the outside mesas are continuous and have the same composition.

13. The semiconductor optical device according to claim 12 including two optical waveguides, each of the two waveguide extending from a respective side of the mesa.

14. The semiconductor optical device according to claim 12, wherein the extended mesas have, in the plan view perpendicular to the surface of the semiconductor substrate, stripe shapes.

15. The semiconductor optical device according to claim 14, wherein each of the extended mesas has, in a cross-sectional view taken perpendicular to the surface of the semiconductor substrate, a trapezoidal shape.

16. The semiconductor optical device according to claim 12 including at least one semiconductor layer on the surface of the semiconductor substrate and interposed between the surface of the semiconductor substrate and the mesa and the extended mesas.

17. The semiconductor optical device according to claim 12, wherein the substrate is InP.

* * * * *